US010649682B1

(12) United States Patent
Chinthekindi et al.

(10) Patent No.: US 10,649,682 B1
(45) Date of Patent: May 12, 2020

(54) FOCUSED SANITIZATION PROCESS FOR DEDUPLICATED STORAGE SYSTEMS

(71) Applicant: EMC IP Holding Company LLC, Hopkinton, MA (US)

(72) Inventors: Ramprasad Chinthekindi, San Jose (CA); Shah Veeral, Pashan (IN); Abhinav Duggal, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 350 days.

(21) Appl. No.: 15/727,010

(22) Filed: Oct. 6, 2017

(51) Int. Cl.
*G06F 16/00* (2019.01)
*G06F 3/06* (2006.01)

(52) U.S. Cl.
CPC .......... *G06F 3/0652* (2013.01); *G06F 3/0608* (2013.01); *G06F 3/0641* (2013.01); *G06F 3/0643* (2013.01)

(58) Field of Classification Search
CPC .... G06F 3/0652; G06F 3/0608; G06F 3/0641; G06F 3/0643; G06F 16/1748; G06F 16/215
See application file for complete search history.

(56) References Cited

U.S. PATENT DOCUMENTS 6,212,600 B1 * 4/2001 Friedman .............. G06F 3/0623 360/60
7,526,620 B1 * 4/2009 McGovern .............. G06F 21/62 711/159
8,527,544 B1 * 9/2013 Colgrove .............. G06F 3/0608 707/791
9,430,164 B1 * 8/2016 Botelho ................ G06F 3/0608
9,432,192 B1 * 8/2016 Pogde ................... H04L 9/0836
10,346,297 B1 * 7/2019 Wallace .............. G06F 16/1748
2004/0188710 A1 * 9/2004 Koren ................. G11C 16/102 257/197
2010/0332454 A1 * 12/2010 Prahlad ................ G06F 3/0649 707/654
2012/0078858 A1 * 3/2012 Nagpal ................. G06F 16/215 707/692
2015/0156209 A1 * 6/2015 Heart .................... H04L 63/083 726/23
2016/0013945 A1 * 1/2016 Offenberg .............. G06F 21/64 713/176
2016/0300069 A1 * 10/2016 Anil ........................ G06F 21/62
2018/0192106 A1 * 7/2018 Loheide ........... H04N 21/26258

* cited by examiner

*Primary Examiner* — Noosha Arjomandi
(74) *Attorney, Agent, or Firm* — Womble Bond Dickinson (US) LLP

(57) ABSTRACT

Described is a deduplicated storage system that may perform a focused sanitization process by reducing the number of data storage containers that must be sanitized. The system leverages additional characteristics of the files that need to be sanitized such as an initial storage date (e.g. data breach date) of when a sensitive file (e.g. file to be sanitization) was actually stored on the deduplicated storage system. By maintaining a creation date of data containers, the system may limit sanitization to those containers having a creation date on or after the initial storage date of the sensitive file. Accordingly, the system is capable of performing a more focused overwriting of data thereby improving the overall efficiency of the sanitization process.

20 Claims, 6 Drawing Sheets

300

Memory

Bit Vector 118

| $A_{fp}$ | $B_{fp}$ | $C_{fp}$ | $D_{fp}$ | $E_{fp}$ |
|---|---|---|---|---|
| 1 | 1 | 1 | 1 | 1 |

| Fingerprint | CID |
|---|---|
| $A_{fp}$ | 0 |
| $B_{fp}$ | 0 |
| $C_{fp}$ | 0 |
| $D_{fp}$ | 0 |
| $E_{fp}$ | 1 |
| ... | ... |
| $Y_{fp}$ | n |
| $Z_{fp}$ | n |

FOCUSED SANITIZATION PROCESS FOR DEDUPLICATED STORAGE SYSTEMS

TECHNICAL FIELD

Embodiments of the present disclosure generally relate to permanently erasing data and any data remnants from a data storage system using a sanitization process. More particularly, embodiments of the disclosure relate to a system that provides an efficient mechanism for sanitizing data stored on a deduplication storage system.

BACKGROUND

Data backup and recovery systems often implement various techniques to efficiently maintain, store, and update data including various operations to delete data. A regular file delete operation makes the file inaccessible via the namespace and frees the underlying data blocks for later reuse, but does not typically render such data blocks unrecoverable. For example, the regular delete operation typically leaves behind a residual representation of the file. Accordingly, in order to permanently erase the data blocks and any remnants, the system must undertake a sanitization process. For example, data sanitization generally refers to the process of deliberately, permanently, and irreversibly removing or destroying the data stored on a storage device. Accordingly, a system (e.g. device or server) that has been sanitized has no usable residual or recoverable data even when using advanced forensic tools.

Typically, a sanitization is required when sensitive or confidential data is inadvertently stored on a system. For example, a Classified Message Incident (CMI) happens when data at a particular classification level is written to a storage not approved for such a classification. For instance, a CMI might occur when a user inadvertently sends an email with "top secret" information to an email system only approved for a lower clearance. As another example, a CMI may occur when information is reclassified after it has been stored on a system with a lower clearance. When a CMI occurs, the system administrator must take action to restore the system to a state as if the sensitive data had never been stored.

Sanitizing a backup or archival storage system, however, introduces unique challenges not present when sanitizing a single device such as a hard drive that might be erased with a pattern of overwrites. For example, if a backup takes place, for example, to a deduplicated storage system before the CMI is rectified, then the deduplicated storage system must also be sanitized. For an in-place storage system, sanitizing an object (file, record, etc.) consists of following metadata references to the physical location within the storage system, overwriting the values one or more times, and erasing the metadata as well as other locations that have become unreferenced. Deduplicated storage systems, however, are often log-structured with large units of writes, which typically do not support in-place erasure of sub-units. Instead, deduplicated storage systems typically require copying forward all live data and then sanitizing the original values. Accordingly, the sanitization process is typically applied to the entire file system of a deduplicated storage system as opposed to individual files. Performing a sanitization process, however, is resource intensive and monopolizes the system from performing other I/O processes and other processes such as garbage collection. Accordingly, the ingest performance of the storage system may be adversely affected. Thus, there is a continued need to perform sanitization that meet or exceed regulations, while still reducing the time and resource requirements of the sanitization process.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

In one or more embodiments, described is a system (and method) for performing a focused sanitization process for a deduplicated storage system. As described above, due to the nature of deduplicated storage systems, previous sanitization techniques typically involved the entire file system and all data structures (e.g. containers). Techniques described herein, however, reduce the amount of data that must be overwritten by specifying a particular range of applicable data structures (e.g. containers) that must be sanitized. For example, the system may leverage additional characteristics of the files that need to be sanitized. In one embodiment, the system may leverage an initial storage date (e.g. data breach date) of when a sensitive file (e.g. file to be sanitization) was actually stored on the deduplicated storage system. By maintaining a creation date of data containers, the system may limit sanitization to those containers having a creation date on or after the initial storage date of the sensitive file. Accordingly, some embodiments of the disclosure provide a more focused overwriting of data thereby improving the overall efficiency of the sanitization process.

It should be noted that various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

Operating Environment Overview

Figure 1:
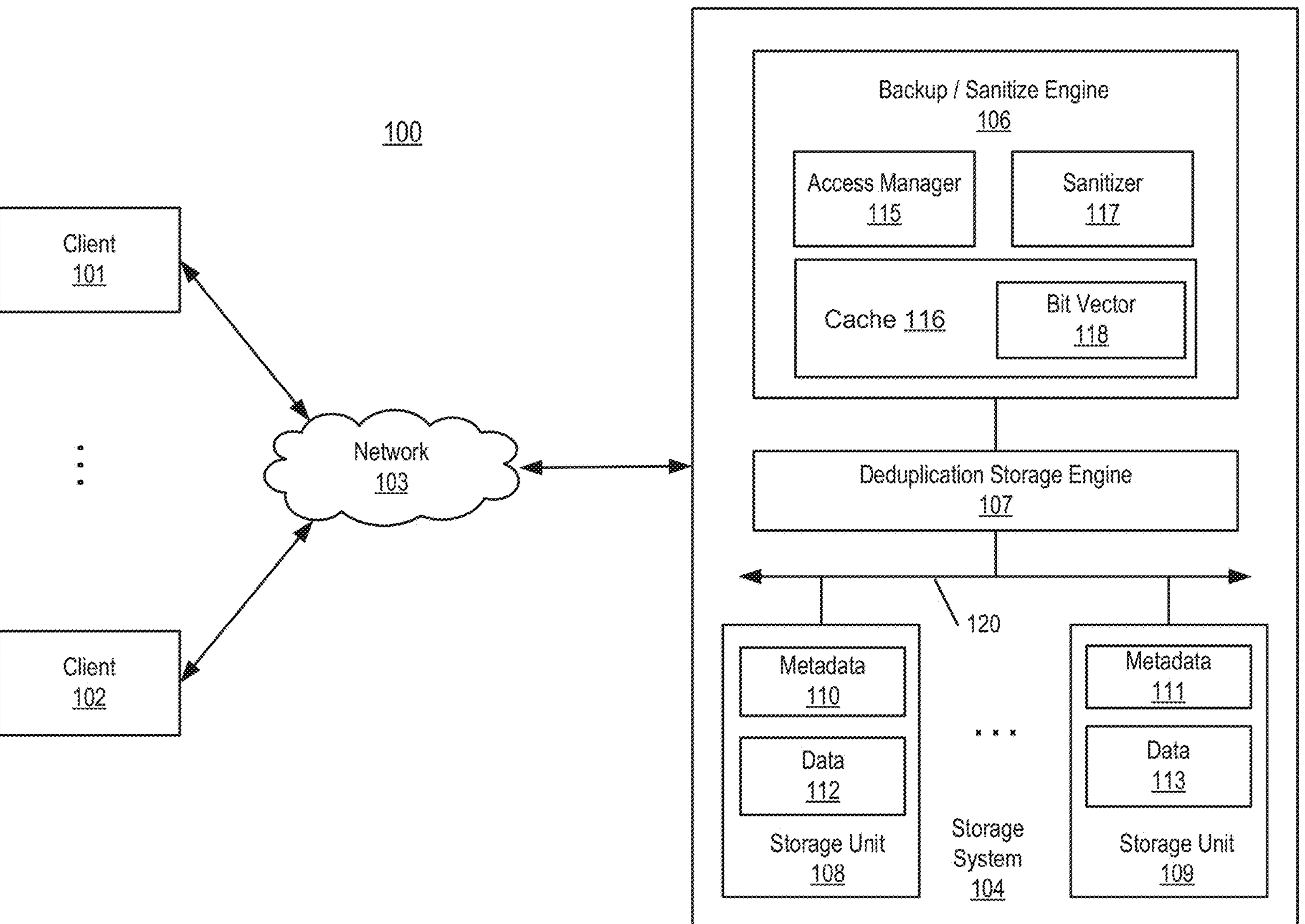
FIG. 1 is a block diagram illustrating a system configuration according to one embodiment of the disclosure.

FIG. 1 is a block diagram illustrating a system configuration 100 according to one embodiment of the disclosure. As shown, system 100 may include one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. In addition, client systems 101-102 may be a primary storage system (e.g., local data center) that provides storage to other local clients, which may periodically back up the content stored therein to a backup storage system (e.g., a disaster recovery site or system), such as storage system 104.

Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple segments (or chunks) according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; etc; delta encoding: a reference to a segment plus a difference, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data 112-113, where a data object may represent a data segment, a compression region (CR) of data segments, or a container of one or more CRs. Fingerprints are mapped to a particular data object via metadata 110-111, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored (e.g., a segment location/entry within a container), reconstruction information for the file using the segments, initial storage date, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the disclosure. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. In one embodiment, as the file ages, different compression techniques may be applied to the file.

Referring back to FIG. 1, according to one embodiment, backup engine 106 includes an access manager 115, cache 116, and sanitizer 117. Access manager 115 is to provide file services to a variety of clients, such as a backup/restore application, to restore files stored in storage units 108-109 or to backup files to storage units 108-109, in this example, represented as data 112-113 that may be deduplicated by deduplication storage engine 107. Typically, when a request is received to access a file such as a backup file, data of the requested file are loaded into a memory of storage system 104. Since the file may be large, only a portion of data of the file is loaded or cached in the memory at a time for accessing.

When a data segment is being accessed, the data object containing the segment is loaded into cache 116 and the request is then serviced using the data object from the cache. Cache 116 may be allocated as a designated memory region of the system memory, which is typically limited in size. When a data object is requested for access, access manager 115 inspects cache 116 to determine whether the requested data object is in cache 116. If so (e.g., cache hit), the data object from cache 116 is used to service the request. If the requested data object is not in cache 116 (e.g., cache miss), access manager 115 is to load the requested data object from storages 108-109 into cache 116. If cache 116 is full, a data object currently stored in cache 116 has to be evicted from cache 116 to make room for the data object currently requested. A data object may represent a data segment, a CR of multiple data segments, or a container of multiple CRs. According to one embodiment, multiple data, such as a CR or a container, may be read into the memory from storage units 108-109. However, only the related individual data segments may be cached in cache 116.

According to one embodiment, sanitizer 117 is responsible for sanitizing the file system, e.g., by copying forward live data segments from a first container to a second, and overwriting the first container with data patterns, such as 0's, 1's, or any data pattern that is predetermined or generated randomly. In one embodiment, the sanitizer copies forward data segments from the first container to the second container according to information of a bit vector 118, which in one embodiment, is a data structure (e.g., an array) of bits, each bit corresponding to a data segment stored in the file system. According to one aspect of the disclosure, each bit of the bit vector 118 stores a bit value indicating whether the corresponding data segment is live and needs to be copied forward. Details of sanitizer 117 will become apparent through the discussion of the various embodiments as further described herein.

It should be noted that some or all of the components as shown and described above (e.g. of FIG. 1) may be implemented in software, hardware, or a combination thereof. For example, such components can be implemented as software installed and stored in a persistent storage device, which can be loaded and executed in a memory by a processor (not shown) to carry out the processes or methods described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Example Deduplication File System

Figure 2:
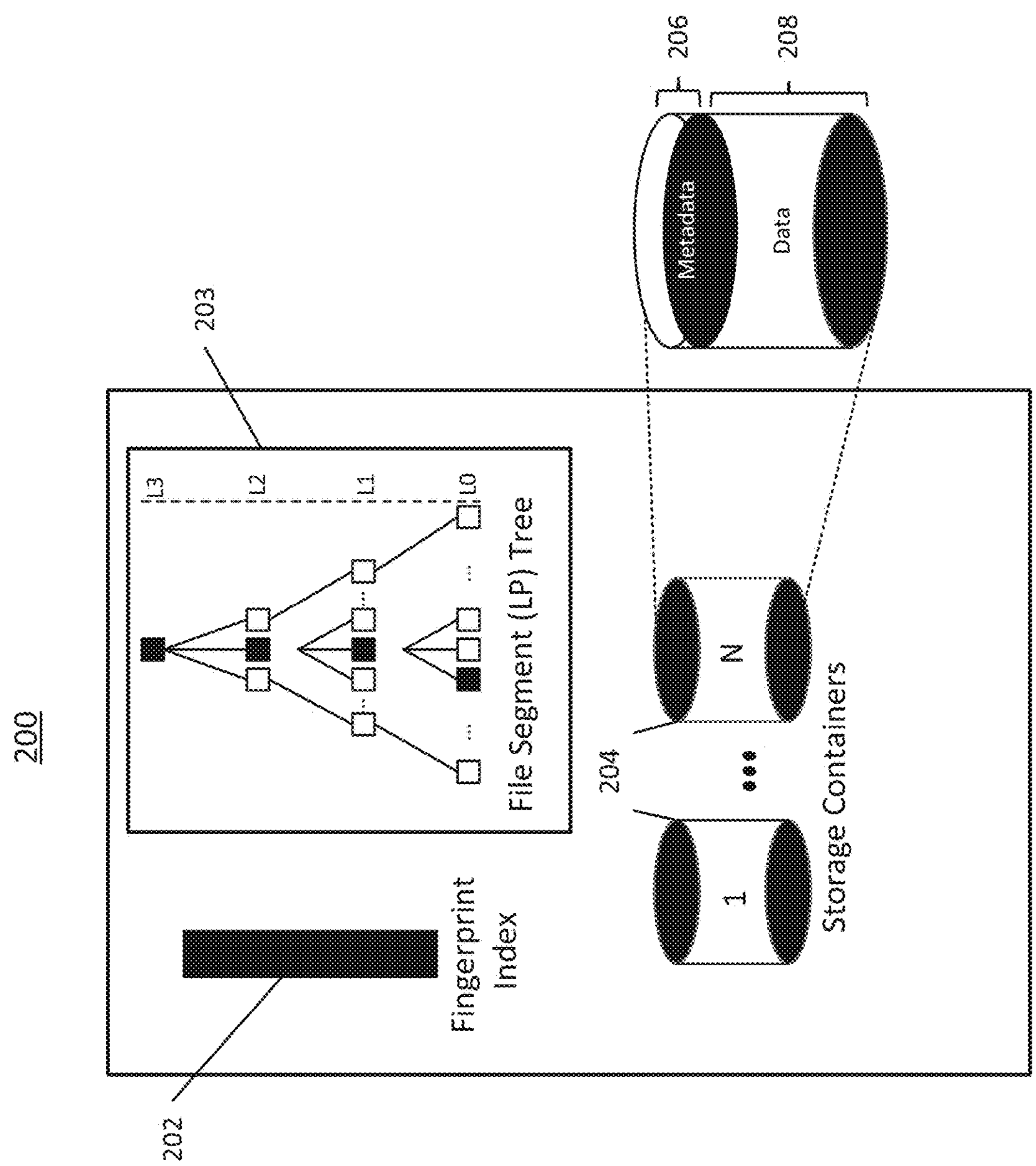
FIG. 2 is a diagram illustrating an example deduplication file system according to one embodiment of the disclosure.

FIG. 2 illustrates an example deduplication file system 200 according to one embodiment of the disclosure. The deduplication file system includes a fingerprint index 202, a file segment tree 203, and one or more storage containers 204 including metadata 206 (e.g. metadata 110-111) and data 208 (e.g. data 112-113). In one embodiment, the fingerprint index 202 is a portion of the metadata 206 on the storage containers 204 and at least a portion of the fingerprint index 202 is stored or cached in memory. The fingerprint index 202 stores information to determine which of the storage containers 204 on which data referenced by a fingerprint is stored. In one embodiment the fingerprint index 202 stores fingerprint data in the form of fingerprint and container identifier pairs (e.g., <FP,CID>) which associate a fingerprint with a container identifier storing the storage segment associated with the fingerprint.

The file segment tree 203 is a portion of the metadata 206 that enables the deduplication file system 200 to reconstruct a file from the underlying data 208. The file segment tree 203 may be referred to as an LP segment tree. In one embodiment the file segment tree 203 is a Merkle tree that may have multiple levels depending on the size of the file. The level zero (L0) segments of the tree are segments with user data. Each L0 segment is identified by a fingerprint, which is one of the fingerprints stored in the fingerprint index 202. The fingerprints are content based fingerprints, such as a hash of the L0 data segment. A level one (L) segment references one or more L0 segments via content based fingerprints. One or more L1 segments can then be referenced by a level 2 (L2) segment, up to the root node of the tree. Accordingly, the L0 segments contain the data 208 within the storage containers 204. In some embodiments segments in layers L1 and up, referred to as LP segments are also stored in the data 208 and each LP segment also has an associated stored in the metadata 206 and in the fingerprint index 202. Segments can be shared among multiple files and in one embodiment may be compressed and packed within a compression region. Multiple compression regions may be packed into a storage container.

Example Configurations of Data Segments and Storage Containers

Figure 3:
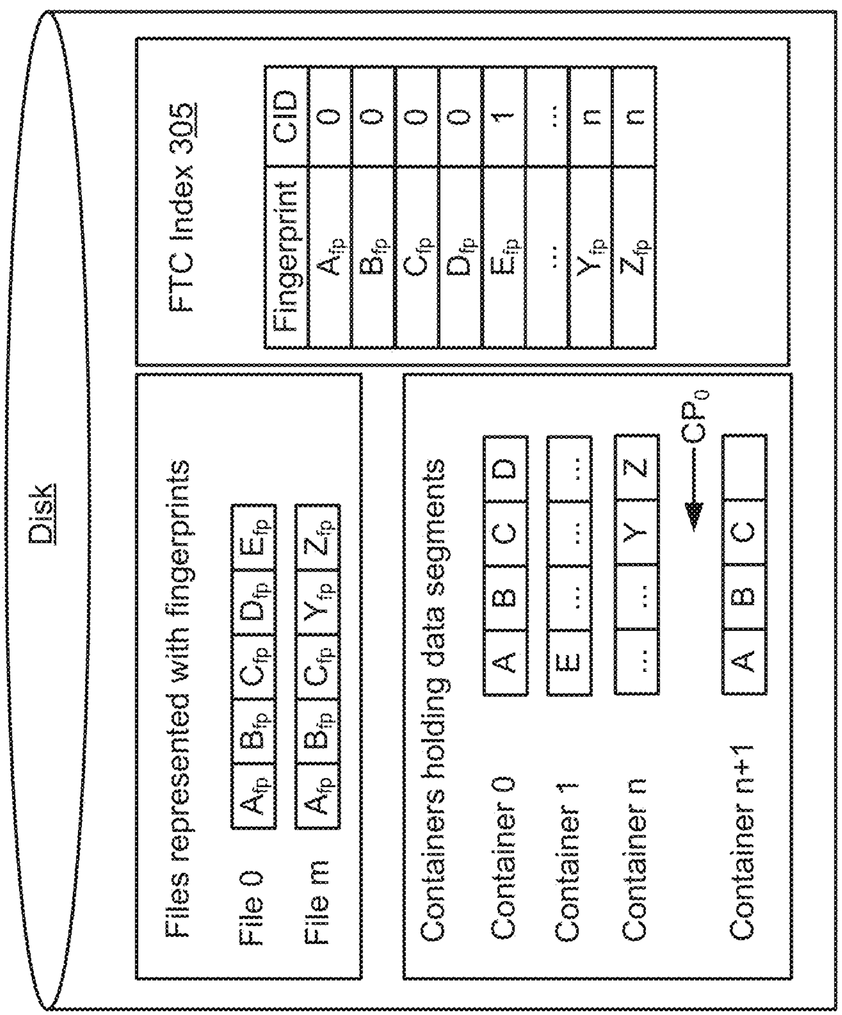
FIG. 3 is a diagram illustrating an example configuration of segments stored within a set of containers according to one embodiment of the disclosure.

FIG. 3 is a diagram 300 illustrating an example configuration of segments stored within a set of containers (e.g. containers 204) according to one embodiment of the disclosure. Throughout the discussion of the various embodiments of the sanitization methods of the present disclosure, the focus will be on a deduplicated file system. However, it will be appreciated that the sanitization methods of the present disclosure are not so limited, and are equally applicable to any storage systems.

Referring now to FIG. 3, when a file is written to a storage system (e.g. storage system 104) it may be partitioned into segments that are the unit of deduplication. Segments may be created with a fixed or variable size. In one embodiment utilizing variable-sized segments, segments may have, for example, an average size of 8 KB. In one embodiment, a secure hash value is calculated over each segment (e.g., SHA1), which refers to its fingerprint or segment reference. In such an embodiment, the file written to the storage system is represented as a list of fingerprints (file recipe) that can be used to reconstruct the file, such as file 0 and file m of FIG. 3.

To perform deduplication, a fingerprint is compared against a fingerprint index (e.g. fingerprint index 202) to determine whether it is duplicate or unique. In one embodiment, the system may include a fingerprint-to-container (FTC) index 305. When performing a deduplicated storage, if a fingerprint is a duplicate, then the current segment does not need to be stored. However, if a fingerprint is unique, then the segment is stored. Identifying duplicates leads to overall space savings for files. In addition, unique segments may also be further compressed, for example, by using GZ-like schemes, grouped together into containers, such as container 0 through container n+1 as shown, and written out as a unit for efficient I/O. By way of example, in one embodiment, the container size may be 4.5 MB. In one embodiment, the containers in a storage system are immutable and form the basis of the log-structured layout. Accordingly, when storing data, data containers may store data in an append mode only.

As illustrated in FIG. 3, file 0 was written to an empty storage system, so all of its segments were unique and were written sequentially to containers 0 and 1. File m was written later, and segments A through C (represented by fingerprints $A_{fp}$ through $C_{fp}$, respectively) were duplicates. Segments Y and Z correspond to modified regions of the file, and those segments were written to container n. Continuing on with this example, suppose file 0 is deleted so that segments D and E are unreferenced. For sanitization, it is necessary to erase D and E from storage. As shown, an index of live segments may be maintained using a bit vector 118 as described above. In embodiments of storage systems where containers are immutable, it is necessary to copy forward live segments A, B, and C to a new container n+1 and overwrite containers 0 and 1 with zeros, ones, random data, or a specified pattern.

In one embodiment, before initiating a sanitization process, the system may delete files to be sanitized from the storage system. In addition, in one embodiment, the system may delete files to be sanitized as part of the sanitization process. Accordingly, files and their referenced segments are referred to as live, and any unreferenced segments are referred to as dead. One challenge for implementing sanitization within a deduplicated storage system is managing segment references so that live segments can be preserved and dead segments erased while minimizing memory and I/O requirements. The embodiments herein may implement various techniques for identifying live segments in an efficient manner. For example, the system may implement a bit vector, bloom filer, perfect hash vector, or any other algorithm to identify and store an indication of live segments. Further non-limiting examples and a disclosure of such techniques, and others, may be found in commonly assigned U.S. Pat. No. 9,317,218, the entirety of which is incorporated herein by reference. For example, the system may store may store an indication of which data segments (e.g. fingerprints) reference live data, and such an indication may be stored in a bit vector using a hash function. Accordingly, as further described herein, the system may then refer to the bit vector to determine which containers include at least one dead segment (e.g. not live) when performing a sanitization process.

Figure 4:
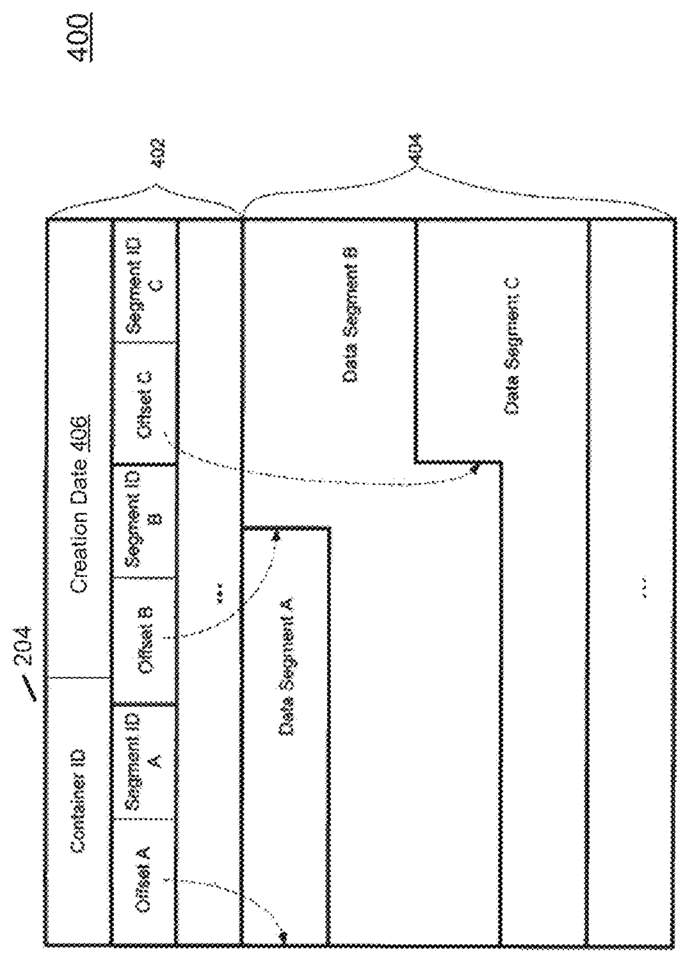
FIG. 4 is a diagram illustrating an example structure of a storage container according to one embodiment of the disclosure.

FIG. 4 is an example structure of a storage container according to one embodiment of the disclosure. As shown in diagram 400, the storage container 204 may include a data portion 404 and a metadata portion 402. The data portion 404 may include the actual data in the form of segments (e.g. data that requires backup), and metadata portion 402 may include information pertaining to the backup data portion that is used to facilitate data backup. As shown, the data portion 404 may include a number of data segments, which are data storage subunits and which may be different in size. The data segments may be stored (e.g. packed) into appropriate containers, and their corresponding offsets and segment IDs may be recorded in the metadata portion 402. As shown, the metadata portion 402 may include a number of offset/segment identifier (ID) pairs. An offset may indicate the offset of the beginning of a data segment. In addition, a segment ID may be used to identify a data segment. In some embodiments, a fingerprint or a modified fingerprint that uniquely identifies the data segment may be used as a segment ID. Also included in the metadata portion are a container ID for identifying the container, and a creation date 406 of the container. For example, a creation date 406 may be recorded upon creation of a new container when storing data to the deduplicated storage system.

Figure 5:
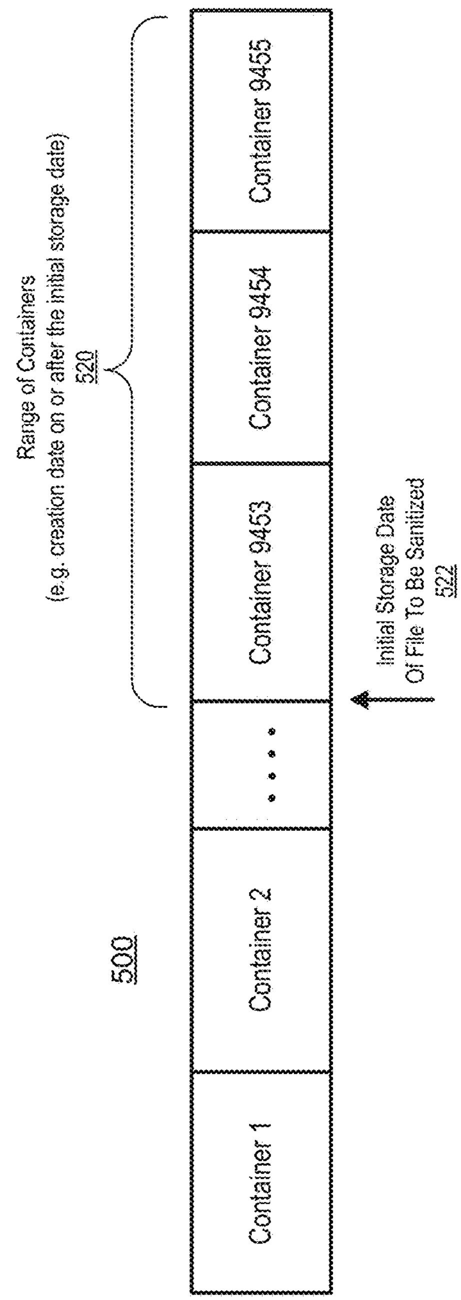
FIG. 5 is a diagram illustrating is an example of identifying a range of containers for the sanitization process according to one embodiment of the disclosure.

FIG. 5 is an example of identifying a range of containers according to one embodiment of the disclosure. As shown, the configuration 500 may include a set of containers. Due to the configuration of a deduplicated storage system, storage containers may be created using an append only structure (e.g. log-structured). Accordingly, the system may leverage such a configuration. As further described herein, the system may determine an initial storage date 522 of a file to be sanitized. Based on this initial storage date 522, the system may limit or identify a range of containers 520 that were created on or after such initial storage date 522. Accordingly, the system may narrow (e.g. focus) the number of containers applicable to the sanitization process thereby limiting the amount of data to be overwritten.

Focused Sanitization Technique

As described above, a deduplicated storage system (e.g. storage system 104) may perform a focused sanitization process by reducing the number of data storage containers that must be sanitized. For example, the system may leverage additional characteristics of the files that need to be sanitized. In one embodiment, the system may leverage an initial storage date (e.g. data breach date) of when a sensitive file (e.g. file to be sanitization) was actually stored on the deduplicated storage system. By maintaining a creation date of data containers (e.g. creation date 406), the system may limit sanitization to those containers having a creation date on or after the initial storage date of the sensitive file. Accordingly, some embodiments of the disclosure provide a more focused overwriting of data thereby improving the overall efficiency of the sanitization process.

Figure 6:
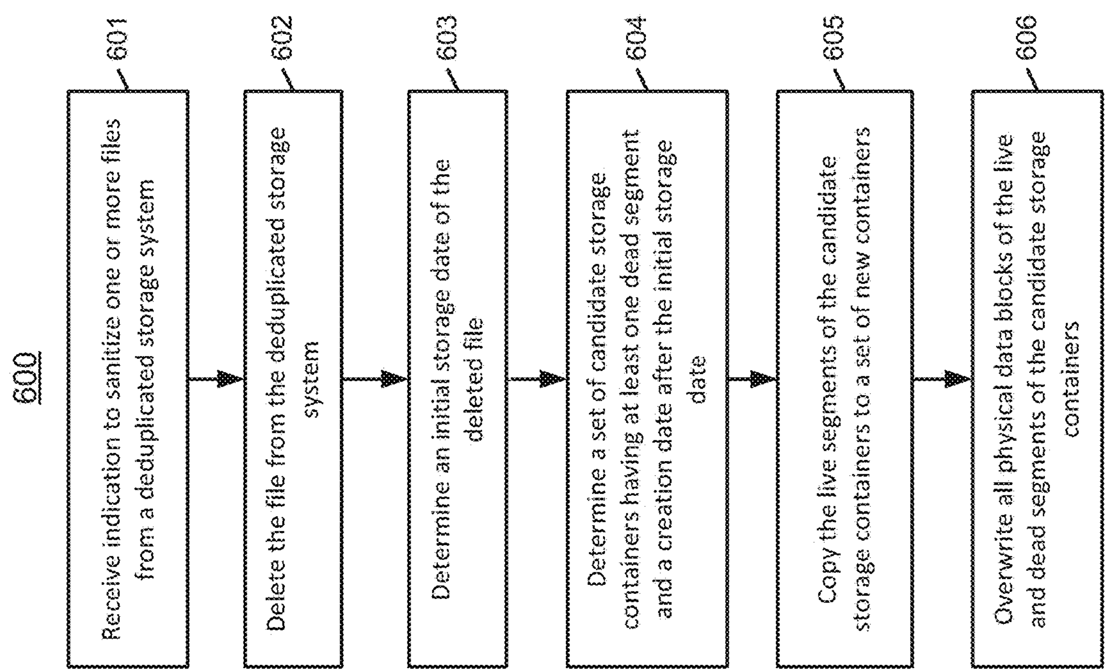
FIG. 6 is a diagram illustrating an example process of performing a sanitization of a file from a storage system according to one embodiment of the disclosure.

FIG. 6 is a diagram illustrating an example process of performing a sanitization of sensitive data from a deduplicated storage system according to one embodiment of the disclosure. Process 600 may be performed by a system (e.g. storage system 104, or system 100).

In 601, the system may receive an indication to sanitize a file (e.g. sensitive file). from a deduplicated storage system. In one embodiment, the indication may be received from a client device (e.g. client device 101). For example, a user from a client device may initiate a sanitization process from an interface. As described above, the deduplicated storage system (e.g. storage system 104) may store files as data segments across one or more storage containers (e.g. as shown and discussed above with respect to FIG. 3).

In 602, the system may delete the file from the deduplicated storage system. As described above, deleting the file from the system may include unreferencing the data segments of the deleted file (e.g. deletion of File 0 leaves segments D and E unreferenced as discussed above with respect to FIG. 3). Accordingly, the unreferenced data segments may be interpreted as dead segments by the system. In one embodiment, the system may delete the file in conjunction with a sanitization process (e.g. after a sanitization process is commenced). For example, a file to be sanitized may be a live file stored on the deduplicated storage system, and accordingly, the system may delete the file as part of the sanitization process. In addition, in one embodiment, the file to be sanitized may have already been deleted from the deduplicated storage system, and accordingly, the sanitization process may be initiated after deletion of the file (e.g. unreferenced, but potentially still recoverable) from the system.

In 603, the system may determine an initial storage date of the file. In one embodiment, the initial storage date may be determined based on one or more attributes. Attributes may include any characteristics or information such as metadata that is associated with a file. For example, the system may maintain a file history (e.g. table or index) of all files (e.g. including currently live or deleted files) stored to the deduplicated storage system. The file history may include information such as the filename, initial storage date, source information (e.g. sending device ID, sender information, etc.), recipient information (e.g. storage target ID, recipient information, etc.), a time of deletion, or any other attributes (e.g. metadata).

In one embodiment, the initial storage date may be determined based on receiving a particular filename of the file to be sanitized. For example, the storage system may reference the file history to determine the initial storage date of when a particular file was first stored on the deduplicated storage system (e.g. via a backup or archival process). In another example, the system may receive (e.g. via an input by the user) a particular date (e.g. data breach date) as the initial storage date. For example, a user may know when a particular file containing sensitive or confidential information was first received and/or provided to the storage system.

The attributes that are stored by the system may even be specific to the type of file. For example, if the file relates to email data, the file history may maintain information such as the sender of an email. Accordingly, the system may sanitize files based on a source (e.g. sanitize all email data from a particular sender). It should be noted that any type attribute may be used to identify an initial storage date of the file. It should also be noted the file history may also maintain attributes of live files as well as deleted files. Accordingly, the initial storage date of a file may be determined irrespective of whether the sanitization process is initiated prior to deleting a particular file or whether the file is deleted in conjunction with the sanitization process.

Additionally, the one or more attributes may be received by the system via various forms of input including input from a user (e.g. user/administrator of a client device). For example, the one or more attributes may be received from an input file. As another example, an input may be received directly from a user. For instance, the user input (e.g. one or more attributes such as a date or filename) may be provided via an interface provided as part of a process to initiate a sanitization process.

In 604, the system may determine a set of candidate storage containers having at least one dead segment and a creation date on or after the determined initial storage date of the deleted file. For example, the system may reference a creation date (e.g. creation date 406) of each of the storage containers within the file system to reduce the number of storage containers to a particular range of candidate storage containers (e.g. range of containers 520). In addition, the system may determine which of the candidate containers also include at least one dead segment. As described above, dead segments may be unreferenced segments of the file to be sanitized, and accordingly, the system may sanitize all of the data blocks of the particular storage container.

In one embodiment, the system may enumerate a file index to determine which segments stored in the deduplicated storage system are live segments. Accordingly, the system may update a bit vector to store an indication of the live segments. For example, each segment of the file index may correspond to a unique bit position within the bit vector. In addition, the system may also use a perfect hash algorithm to ensure that there a no collisions when indicating which segment are live. Accordingly, the system may reference the bit vector that indicates live segments to determine if a container includes as least one dead segment. For example, the bit vector may indicate that a particular segment in a particular container is not indicated as live, and accordingly, the system may mark the particular container for sanitization (e.g. copy forwarding live segments and then overwriting the physical data blocks of all the segments (e.g. dead and live) of the container).

In 605, the system may copy (e.g. copy forward) live segments of the candidate storage containers to a new set of corresponding storage containers. For example, the system may copy forward all of the live data segments of each candidate container to a new set of corresponding storage containers. In one embodiment, copying live segments of the candidate storage containers may include determining a set of segments stored in each of the candidate containers by referencing the bit vector to determine which of the set of segments are indicated as the live segments. Thus, the system may copy only the live segments of the candidate storage containers to the new set of corresponding storage containers.

In 606, the system may sanitize the candidate storage containers by overwriting all physical data blocks of the live and dead segments of the candidate storage containers. The overwriting may utilize any suitable method to secure the data. For example, in one embodiment, the overwriting (or erasing) may adhere to one or more guidelines or specific regulations. For example, the sanitization process may adhere to the National Institute for Standards and Technology's (NIST) Special Publication 800-88: Guidelines for Media Sanitization. Accordingly, upon completion of the sanitization process the data is permanently unrecoverable. As described above, some of the embodiments herein provide an efficient mechanism to perform a sanitization of sensitive data from a deduplicated storage system.

Example Computing System

Figure 7:
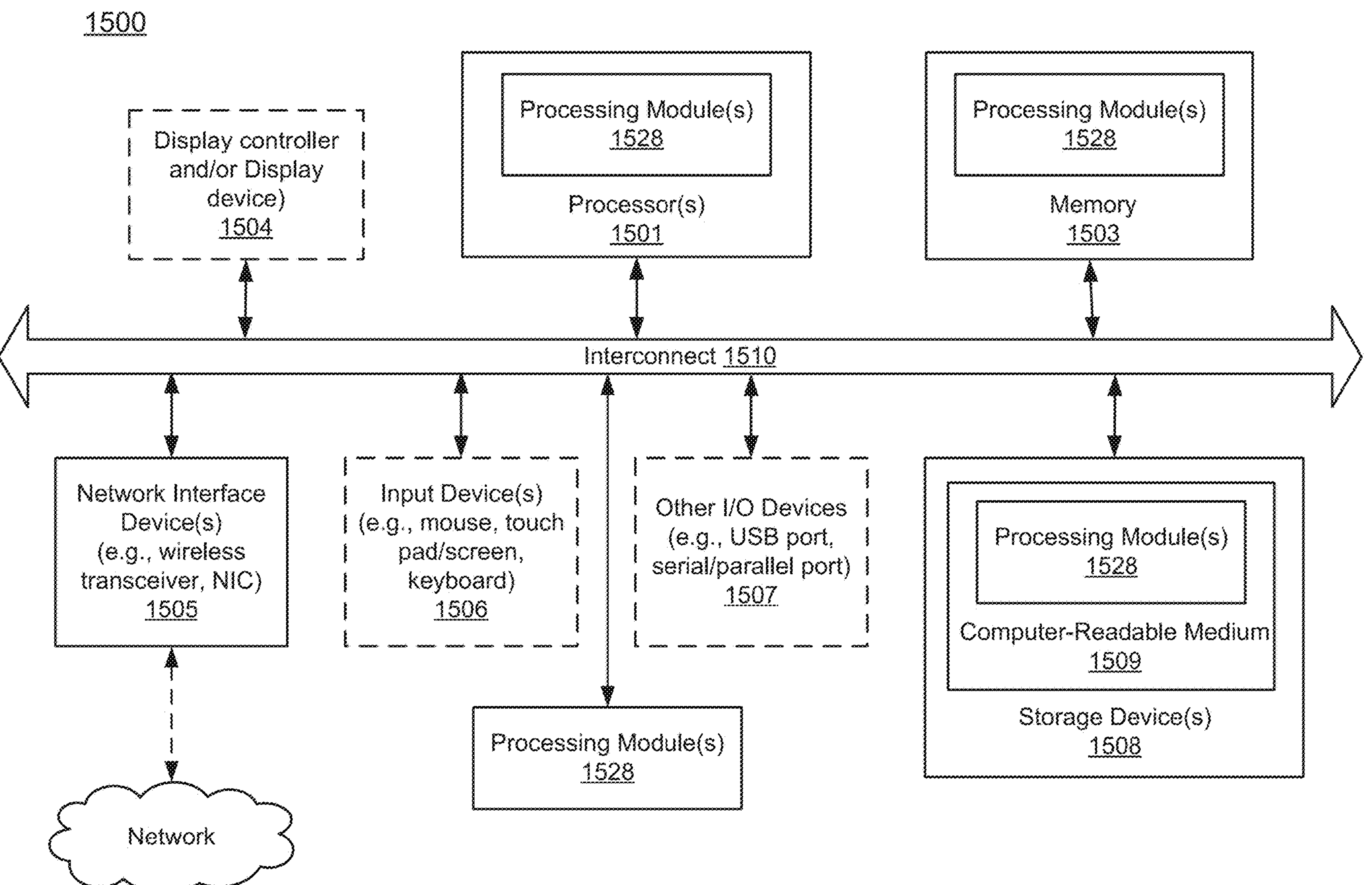
FIG. 7 is a block diagram illustrating an example computing system that may be used in conjunction with one or more embodiments of the disclosure.

FIG. 7 is a block diagram illustrating an example computing system that may be used in conjunction with one or more embodiments of the disclosure.

For example, system 1500 may represent any of data processing systems described above performing any of the processes or methods described above, such as, for example, one or more components shown in configuration 100 (e.g. system 100, clients 101, storage system 104). System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a keyboard, a touch sensitive screen, a pointer device, etc. IO devices 1507 may include various electronic displays (e.g., a monitor having a screen, a small LCD touch-screen or any other electrical device that is operable to display information). Other IO devices 1507 may further include universal serial bus (USB) port(s), parallel port(s), serial port(s), a printer, a network interface, a bus bridge (e.g., a PCI-PCI bridge), or a combination thereof.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein.

Processing modules 1528 (or component/unit/logic) may represent any of the components of configuration 100, such as, for example, backup/sanitize engine 106, deduplication storage engine 107, etc. Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures (e.g. FIG. 6) may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for sanitizing data stored in a storage system, comprising:

receiving an indication to sanitize a file from a deduplicated storage system, wherein the deduplicated storage system stores files as data segments across one or more storage containers;

deleting the file from the deduplicated storage system, wherein deleting the file from the deduplicated storage system includes unreferencing the data segments of the deleted file, wherein the unreferenced data segments are interpreted as dead segments by the storage system;

determining an initial storage date of the file, wherein the initial storage date is based on one or more attributes associated with the file;

determining a set of candidate storage containers having at least one dead segment and a creation date on or after the determined initial storage date of the file;

copying live segments of the candidate storage containers to a new set of corresponding storage containers, wherein an enumerated file index determines which segments stored in the deduplicated storage system are the live segments; and sanitizing the candidate storage containers by overwriting physical data blocks of the live and dead segments of the candidate storage containers.

2. The method of claim 1, wherein determining the initial storage date of the file includes:

receiving, by the deduplicated storage system, the one or more attributes associated with file;

accessing a file history of files stored to the deduplicated storage system, wherein the file history stores one or more attributes associated with each file and an initial storage date indicating a date each file was first stored to the deduplicated storage system; and determining the initial storage date of the file based on the received one or more attributes.

3. The method of claim 2, wherein the received one or more attributes includes at least a filename of the file to be sanitized.

4. The method of claim 2, wherein determining the initial storage date of the file further includes:

providing, via a user interface to be displayed on a client device, an option to provide an input for the one or more attributes associated with the file.

5. The method of claim 1, further comprising:

updating a bit vector to indicate the live segments, wherein each segment of the file index corresponds to a unique bit position within the bit vector.

6. The method of claim 5, wherein copying live segments of the candidate storage containers to the new set of corresponding storage containers includes:

determining a set of segments stored in each of the candidate containers;

referencing the bit vector to determine which of the set of segments are indicated as live segments; and copying only the live segments of the candidate storage containers to the new set of corresponding storage containers.

7. The method of claim 1, wherein the storage containers of the deduplicated storage system are immutable and part of a log-structured file system.

8. A system, comprising:

a memory storing instructions; and a processor coupled to the memory to execute the instructions from the memory, the processor performing operations, comprising:

receiving an indication to sanitize a file from a deduplicated storage system, wherein the deduplicated storage system stores files as data segments across one or more storage containers;

determining an initial storage date of the file, wherein the initial storage date is based on one or more attributes associated with the file;

determining a set of candidate storage containers having at least one dead segment and a creation date on or after the determined initial storage date of the file;

copying live segments of the candidate storage containers to a new set of corresponding storage containers, wherein an enumerated file index determines which segments stored in the deduplicated storage system are the live segments; and sanitizing the candidate storage containers by overwriting physical data blocks of the live and dead segments of the candidate storage containers.

9. The system of claim 8, the operations further comprising:

deleting the file from the deduplicated storage system, wherein deleting the file from the deduplicated storage system includes unreferencing the data segments of the file, wherein the unreferenced data segments are interpreted as dead segments by the storage system.

10. The system of claim 9, wherein determining the initial storage date of the file includes:

receiving, by the deduplicated storage system, the one or more attributes associated with file;

accessing a file history of files stored to the deduplicated storage system, wherein the file history stores one or more attributes associated with each file and an initial storage date indicating a date each file was first stored to the deduplicated storage system; and determining the initial storage date of the file based on the received one or more attributes.

11. The system of claim 10, wherein the received one or more attributes includes at least a filename of the file.

12. The system of claim 10, wherein determining the initial storage date of the file further includes:

providing, via a user interface to be displayed on a client device, an option to provide an input for the one or more attributes associated with the file to be sanitized.

13. The system of claim 9, further comprising:

updating a bit vector to indicate the live segments, wherein each segment of the file index corresponds to a unique bit position within the bit vector.

14. The system of claim 13, wherein copying live segments of the candidate storage containers to the new set of corresponding storage containers includes:

determining a set of segments stored in each of the candidate containers;

referencing the bit vector to determine which of the set of segments are indicated as live segments; and copying only the live segments of the candidate storage containers to the new set of corresponding storage containers.

15. A non-transitory computer-readable medium storing instructions which, when executed by one or more processors, cause the one or more processors to perform operations, comprising:

deleting a file from a deduplicated storage system, the deduplicated storage system stores files as data segments across one or more storage containers, wherein deleting the file from the deduplicated storage system includes unreferencing the data segments of the file, wherein the unreferenced data segments are interpreted as dead segments by the storage system;

receiving an indication to sanitize the file from a deduplicated storage system;

determining an initial storage date of the file, wherein the initial storage date is based on one or more attributes associated with the file;

determining a set of candidate storage containers having at least one dead segment and a creation date on or after the determined initial storage date of the file;

copying live segments of the candidate storage containers to a new set of corresponding storage containers, wherein an enumerated file index determines which segments stored in the deduplicated storage system are the live segments; and sanitizing the candidate storage containers by overwriting physical data blocks of the live and dead segments of the candidate storage containers.

16. The medium of claim 15, wherein determining the initial storage date of the file includes:

receiving, by the deduplicated storage system, the one or more attributes associated with file;

accessing a file history of files stored to the deduplicated storage system, wherein the file history stores one or more attributes associated with each file and an initial storage date indicating a date each file was first stored to the deduplicated storage system; and determining the initial storage date of the file based on the received one or more attributes.

17. The medium of claim 16, wherein the received one or more attributes includes at least a filename of the file.

18. The medium of claim 16, wherein determining the initial storage date of the file further includes:

providing, via a user interface to be displayed on a client device, an option to provide an input for the one or more attributes associated with the file to be sanitized.

19. The medium of claim 15, further comprising:

updating a bit vector to indicate the live segments, wherein each segment of the file index corresponds to a unique bit position within the bit vector.

20. The medium of claim 19, wherein copying live segments of the candidate storage containers to the new set of corresponding storage containers includes:

determining a set of segments stored in each of the candidate containers;

referencing the bit vector to determine which of the set of segments are indicated as live segments; and copying only the live segments of the candidate storage containers to the new set of corresponding storage containers.

* * * * *